UNITED STATES PATENT OFFICE.

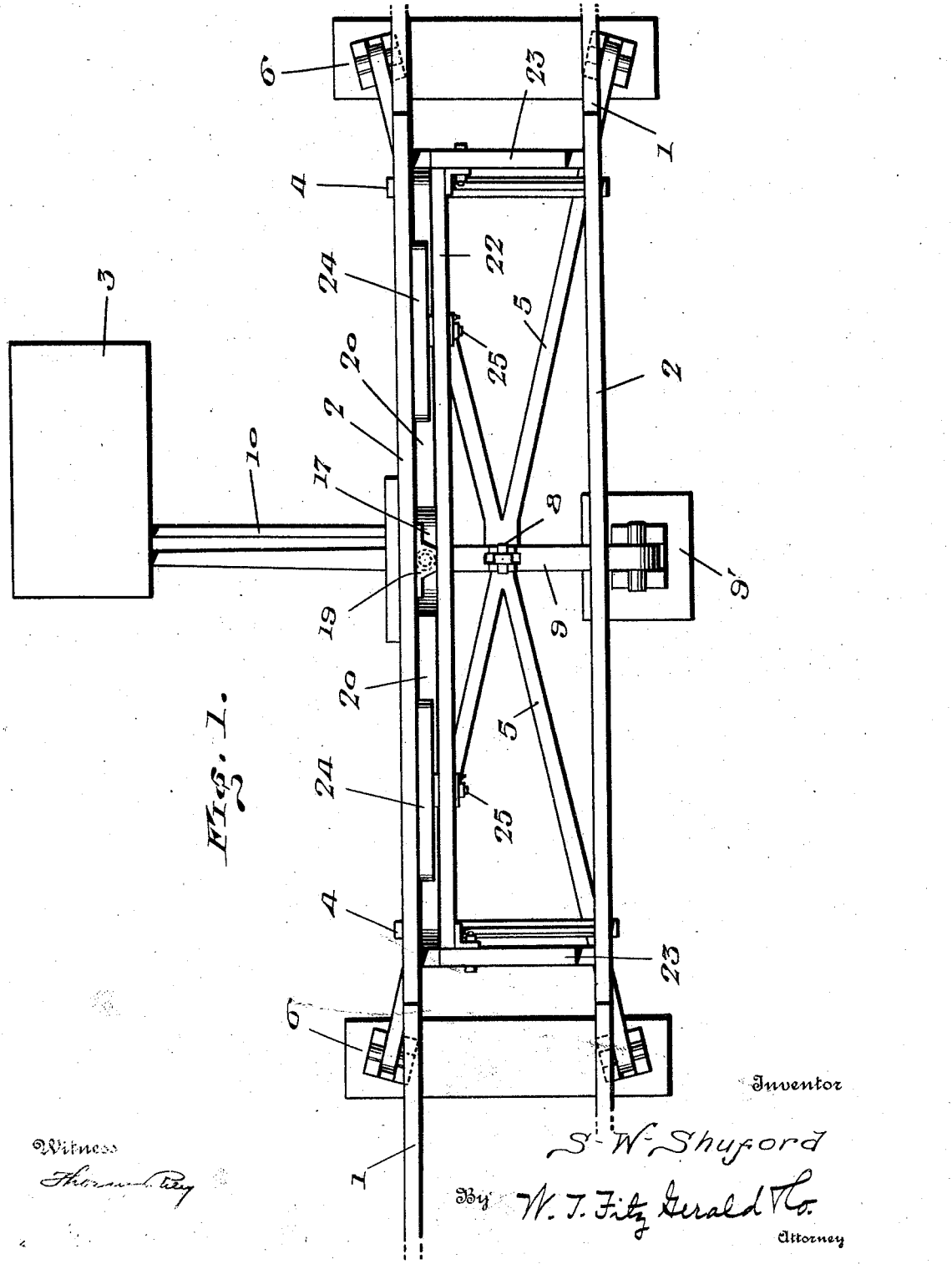

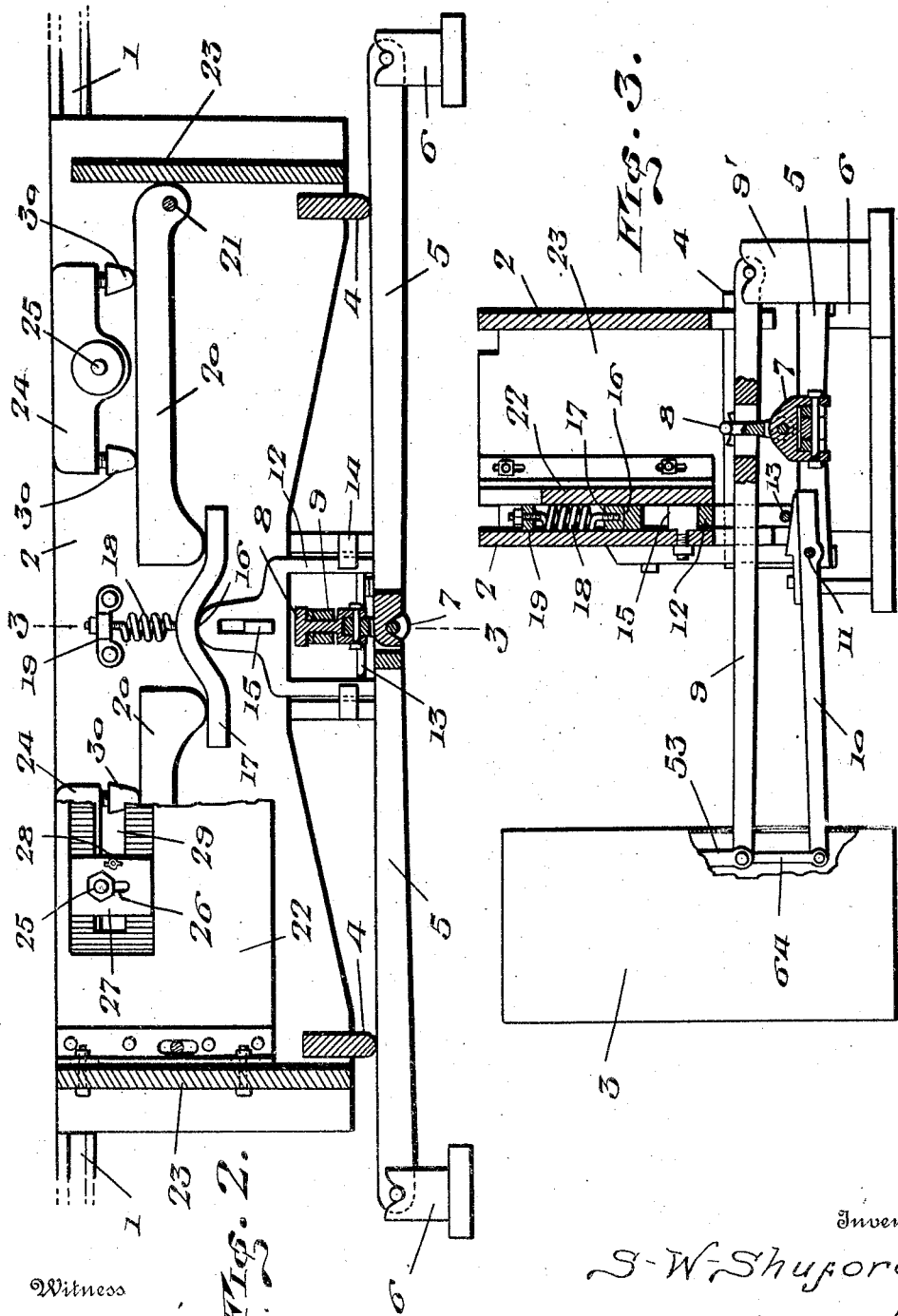

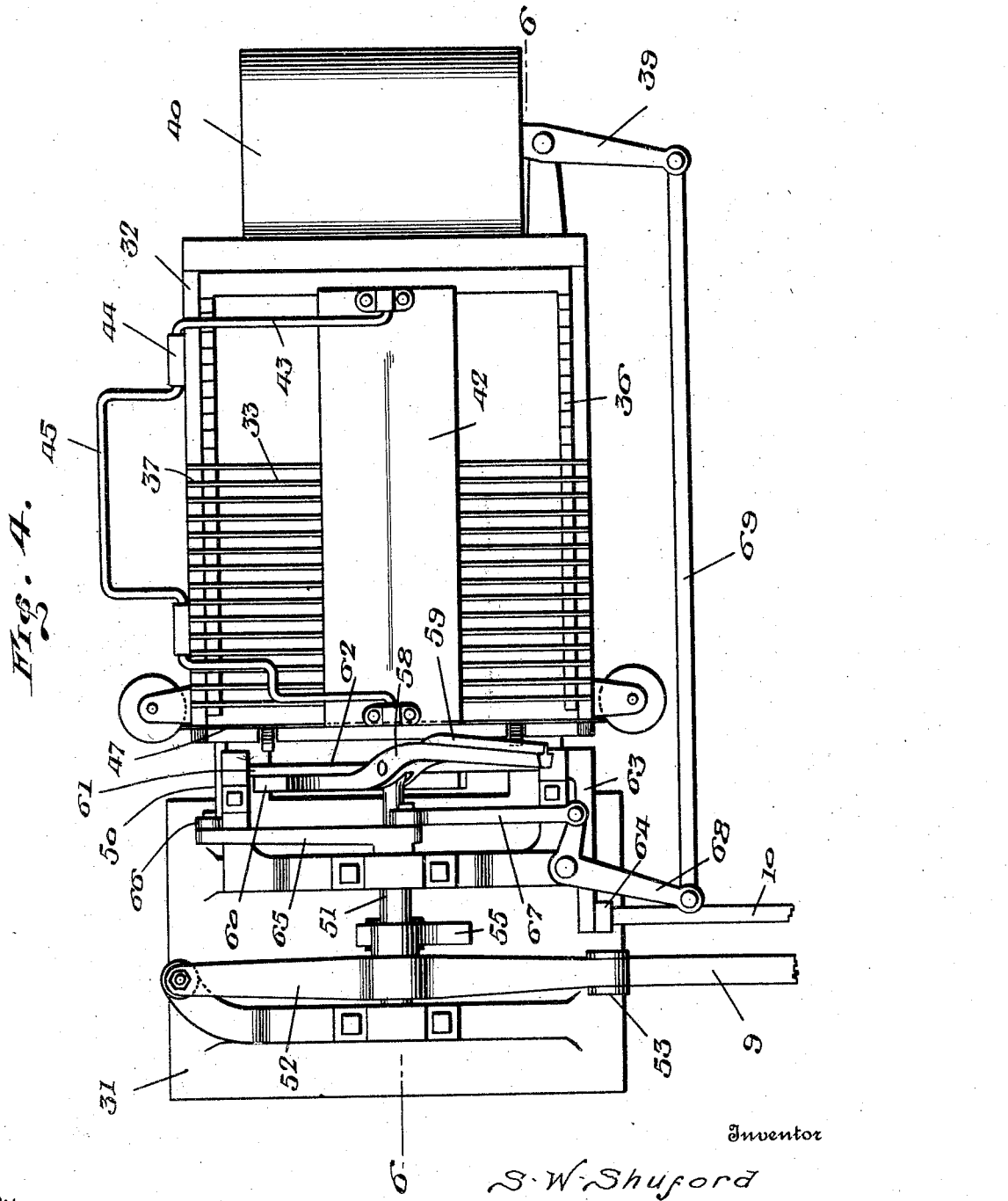

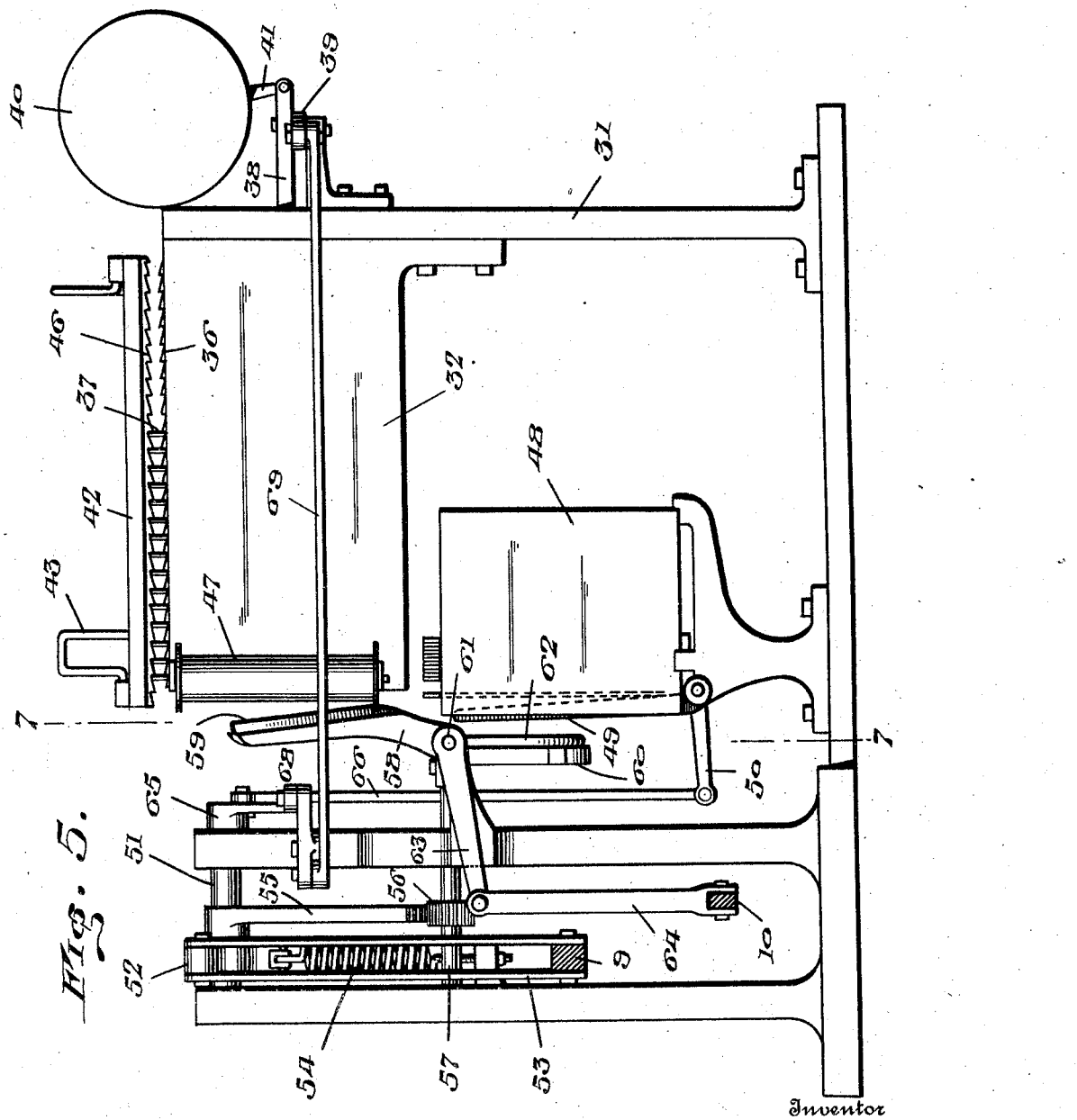

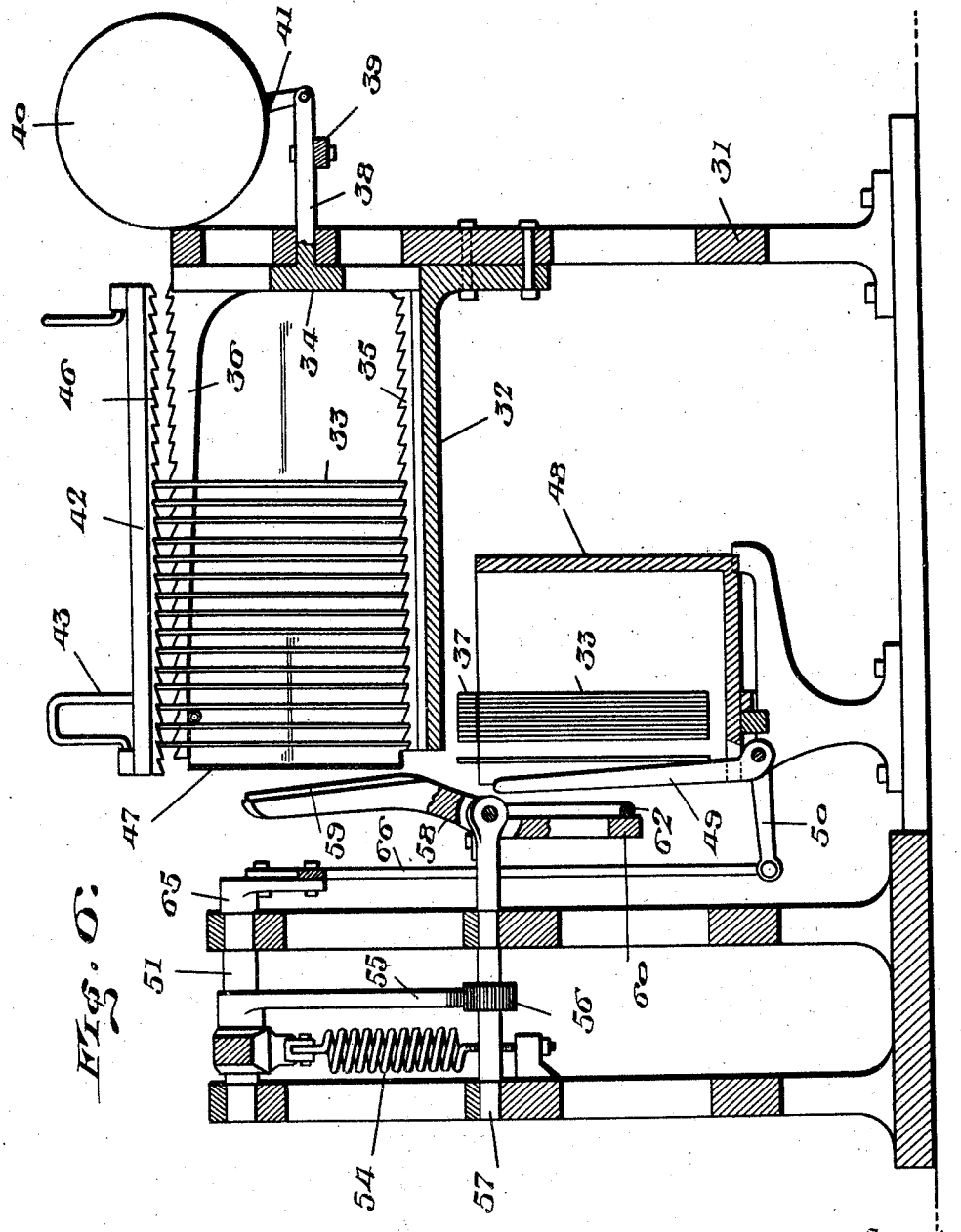

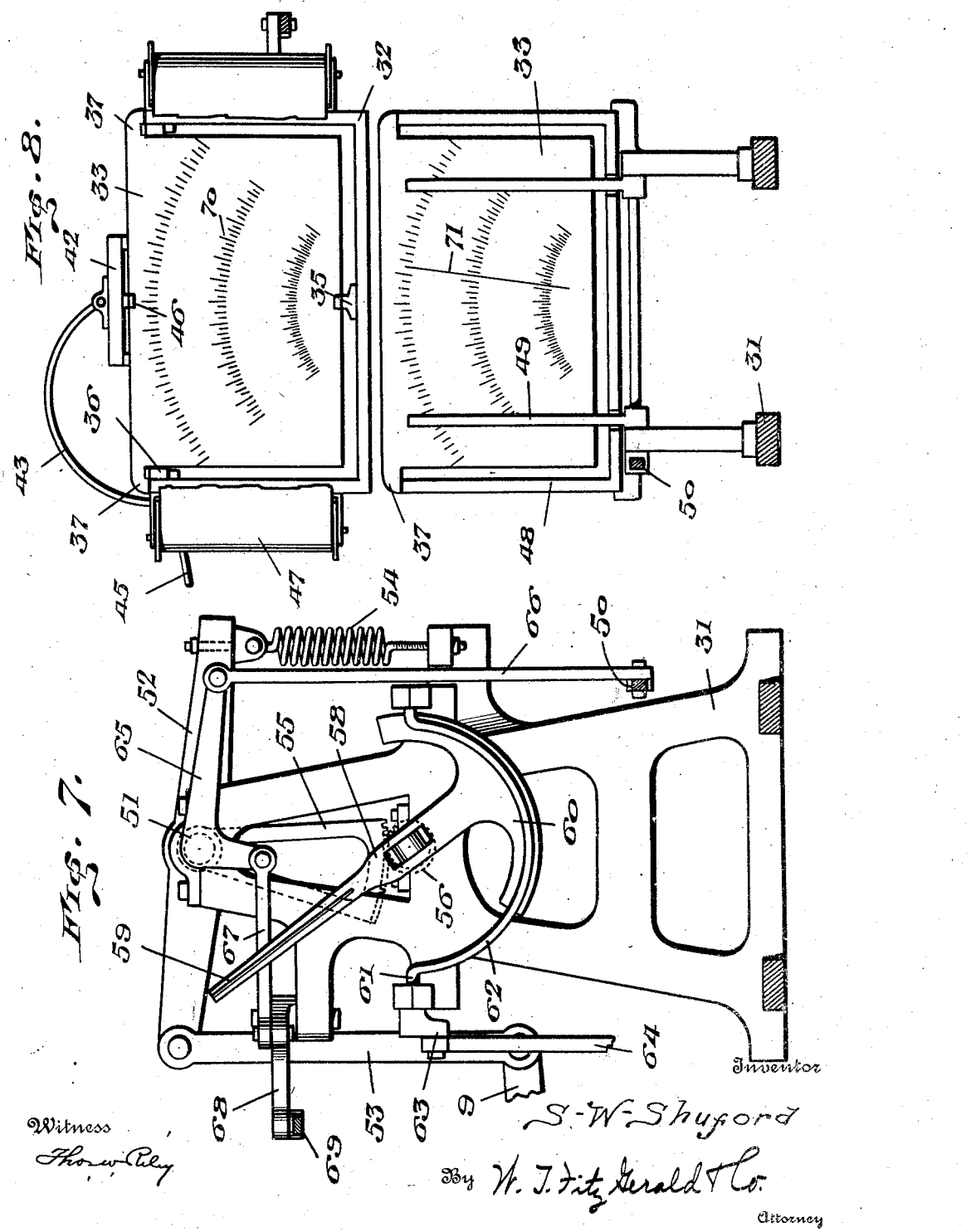

STEPHEN WALTER SHUFORD, OF WOODLAWN, NORTH CAROLINA.

WEIGHING MECHANISM.

1,422,141. Specification of Letters Patent. Patented July 11, 1922.

Application filed August 8, 1919. Serial No. 316,142.

*To all whom it may concern:*

Be it known that I, STEPHEN WALTER SHUFORD, a citizen of the United States, residing at Woodlawn, in the county of McDowell and State of North Carolina, have invented certain new and useful Improvements in a Weighing Mechanism; and I do hereby declare the following to be a full, clear, and exact description of the invention, such as will enable other skilled in the art to which it appertains to make and use the same.

The present invention relates to scales and weighing mechanisms, and aims to provide a novel and improved apparatus for automatically weighing and recording the weights of successive objects passing over a part of the apparatus, such as a train of cars.

A further object is the provision of a weighing and recording mechanism in which a series of cards have imprinted or otherwise recorded thereon in succession the weights of the cars of a train or other series of objects to be weighed, in order that a record of the weight of each car or object will be had upon the respective card or sheet, and enabling the aggregate weight of the train of cars or objects to be determined.

A still further object is to provide novel and improved features of construction to enhance the operation and utility of the mechanism, so that it will function properly and efficiently, and means being provided whereby the imprint on the card or sheet is only made when the car or object is in a predetermined position on the apparatus, so as to avoid false marking of record.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the apparatus showing the recording means enclosed within a casing.

Figure 2 is a longitudinal vertical section of the "platform" construction over which the railroad cars move.

Figure 3 is a cross section taken on the line 3—3 of Figure 2.

Figure 4 is a plan view of the recording device.

Figure 5 is a side elevation of the recording device.

Figure 6 is a longitudinal vertical section of said device, portions being shown in elevation.

Figure 7 is a cross section taken on the line 7—7 of Figure 5 looking toward the left, and Figure 8 is a view on the same section line looking in the opposite direction, a portion of the printing ribbon or sheet being broken away.

The present apparatus is illustrated as being designed for railroad use, to weigh and record the weights of a train of cars passing over the "platform," although the apparatus can be provided with various platforms or yieldable supporting means over which various objects can be moved in succession to be weighed and their weights recorded.

The rails 1 of the track on which the apparatus is used, have interposed therein the rail sections or plates 2 alining with the rails 1 for the travel of cars over the "platform" of which the rail sections or plates 2 constitute a part, said platform being of a length to accomodate one car. Disposed at one side of the track is a casing or housing 3 enclosing the recording device which is operated automatically as the cars move in succession over the platform, as will hereinafter more fully appear.

The vertical longitudinal plates 2, the upper edges of which either form or support the rail sections, are mounted on transverse bearing members 4 near the ends of said plates, and said bearing members are seated on levers 5 that have their opposite ends fulcrumed on supports 6 at the opposite ends of the platform. The adjacent ends of the levers 5 pivotally engage a stirrup 7 that is suspended from a bearing member 8 seating on a transverse scale beam or lever 9 that has one end fulcrumed on a supporting block 9' at one side of the track, and said beam 9 projects toward the opposite side to the casing 3. The free ends of the levers 5 are thus supported by the yieldably-supported beam or lever 9, and said levers 5 in turn support the platform yieldingly, so that when a car or other object moves onto and is supported by the platform, the levers 5 will be depressed proportionately to the weight of the car or object, thereby correspondingly depressing the beam 9. In this way, the beam 9 will control the recording device according to the weight of the object.

The railroad platform is equipped with means to bring the recording device into operation when the car is in a predetermined position on the platform, thereby preventing the recording device from making a false or premature record, and assuring of the proper positioning of the car on the platform before the record is made. For this purpose, a transverse recording lever 10 extending longitudinally along the beam or lever 9, into the casing 3, is pivoted, as at 11, to one of the plates 2, and said plate carries a vertically-slidable bearing member 12 having a rod 13 bearing on the short arm of the lever 10. This member 12 is movable in guides 14, and also has a slot receiving a guide 15 carried by the corresponding plate 2. The upper end of the member 12 terminates in a fulcrum 16 on which the intermediate portion of a floating lever 17 is seated, and said lever is raised by retractile spring 18 supported, as at 19, from the plate 2. Two levers 20 extending toward one another have their adjacent ends bearing on the opposite arms of the lever 17, and the opposite ends of the levers 20 are pivoted, as at 21, between the corresponding plate 2 and a longitudinal partition 22 adjacent to and parallel with said plate 2 and secured at its ends to cross pieces 23 secured to the plates 2, and constituting the frame of the platform. Arranged above the levers 20 between the partition 22 and corresponding plate 2 are tread members 24 arranged to be depressed by the flanges of the car wheels, said tread members being located at the inner side of the upper edge or rail portion of the corresponding plate 2. These tread members 24 are provided between their ends with pivots 25 working within vertical slots 26 in blocks 27 adjustable longitudinally along the partition 22, and said partition has the slots 29 receiving the pivots 25 and permitting of vertical movement thereof as well as longitudinal adjustment of the blocks 27. These blocks can thus be slid longitudinally so as to position the members 24 properly on the levers 20, so that the front and rear trucks of a car will move over and press down simultaneously on both tread members 24 in a predetermined position of the car, thereby determining the operation accordingly. Said members 24 are provided near their opposite ends with bearing members 30 resting on the levers 20 and threadedly or otherwise adjustably connected to the members 24, whereby said bearing members 30 can be adjusted so as to require the depression of both ends of the tread members 24 to operate the levers 10 sufficiently for making the record. It will be noted that when either lever 20 is depressed, it will swing the lever 17 to raise the other lever 20, thereby avoiding the depression of the bearing member 12 and lever 10, whereas when both levers 20 are depressed a sufficient amount, the lever 17 will be depressed, thereby moving the bearing member 12 downwardly to swing the lever 10. By proper adjustment of the tread members 24 and bearing members 30 thereof, it will require a positioning of both trucks of a car over the tread members 24 to move the lever 10 sufficiently to make the record, so that the depression of only one member 24 or the incomplete depression of both of them will not be sufficient to make a false record.

Coming to the recording device enclosed within the casing 3, the working parts thereof are carried by a suitable frame 31. A card magazine 32 is supported by the frame 31 and holds a series of record cards 33 which are fed forwardly to receive the records in succession. For this purpose, the reciprocatory feeder 34 is provided in the rear end of the magazine 32, and has a lower longitudinal ratchet bar 35 extending forwardly along the bottom of the magazine, and said feeder has a pair of longitudinal ratchet bars 36 extending forwardly along the sides and upper edges of the magazine. The lower edges of the cards 33 engage the ratchet teeth of the ratchet bar 35 and said cards 33 have lugs 37 extending from their side edges adjacent to the upper edge so as to engage over the teeth of the ratchet bars 36. The feeder 34 has a stem 38 extending out through the rear end of the magazine to be operated by a lever 39, and a register 40 of any suitable kind is preferably provided to count the number of cards that are fed from the magazine, the operating arm 41 of the register 40 being connected to the stem 38 as shown.

A presser bar 42 bears on the upper edges of the cards 33 over the magazine, to hold said cards down in engagement with the ratchet teeth, and said presser bar 42 is carried by an arm 43 overhanging the magazine, and pivoted to one side thereof, as at 44, said arm having a handle 45 for convenience in raising the bar 42 to enable a new set of cards to be placed in the magazine. The bar 42 is preferably provided on the under surface thereof with a longitudinal ratchet bar 46, the teeth of which engage the upper edges of the cards 33 to prevent said cards from moving rearwardly after having been moved forwardly by the feeder 34. When the feeder 34 moves forwardly, the ratchet teeth thereof will move all of the cards 33 forwardly one step, and the ratchet teeth of the presser bar 42 in engaging behind the upper edges of the cards, will hold said cards in place while the feeder returns rearwardly. Thus, each time the feeder moves forwardly and back, the cards are fed forwardly one step, to bring a new card in position at the forward end of the magazine to receive the record, while the card which has previously received the record, will drop down into a receptacle 48 below the forward end of the magazine. An upwardly extending deflector 49 is provided at its forward end or mouth of the receptacle 48 and serves to deflect a card which drops from the forward end of the magazine, rearwardly into the receptacle. Thus, a card in being ejected from the magazine by forward movement of the feeder 34 will drop into the receptacle 48, being deflected rearwardly by the deflector 49 and the lugs 37 of the cards will rest on the side walls of the receptacle. The deflector 49 is hinged to swing rearwardly and move the cards in the receptacle, and said deflector has an operating arm 50. The formost card in the magazine is released, when it is fed forwardly one step, and the feeder 34 returned, so that this card which has received the last imprint, will drop down into the receptacle.

A ribbon or sheet 47 extends across the forward end of the magazine and is treated with ink or other medium so as to print on the foremost card in the magazine, and this ribbon or sheet can be stationary or wound upon spools, whichever is desired.

Journaled on the frame 31 in front of the magazine is a longitudinal shaft 51 carrying a lever 52 which is connected by a link 53 with the beam 9, and a spring 54 connected to the lever 52 normally swings same to zero position when there is no load on the platform, the depression of the platform swinging the beam 9 downwardly so that the link 53 will transmit the motion to the lever 52 and shaft 51. A gear segment 55 is secured to the shaft 51 and is moved a distance proportional to the weight of the car or object on the platform, and said segment meshes with a pinion 56 secured on a second shaft 57 mounted in the frame below the shaft 51. A marking or printing lever 58 is pivoted on the rear end of the shaft 57 in front of the magazine and receptacle, to swing about an axis transversely of the shaft 57, and said lever has an upwardly extending arm provided with a printing edge 59 in front of the magazine and printing ribbon 47. This lever 58 swings transversely of the magazine to move the printing edge 59 from its normal position at one side across the face of the foremost card, so that said printing edge has a sweeping motion across the card, and will be moved a distance proportional to the weight of the object, since the shaft 57 and lever 58 are turned a distance according to the depression of the beam 9.

The lower arm of the lever 58 has a curved wing 60 providing for the printing operation through the medium of a transverse rock shaft 61 carried by the frame and having a semi-circular crank or off set portion 62 extending in front of the wing 60 to move same forwardly, so that the printing edge 59 is moved rearwardly to press the ribbon 47 against the foremost card. The shaft 61 has an arm 63 connected by a link 64 with the recording lever 10, so that when said lever 10 is swung sufficiently by the depression of the tread members 24, the shaft 61 will swing the printing or marking lever 58 to make the imprint.

The card feeder 34 and deflector 49 are operated from the shaft 51, on which a lever 65 is secured. A link 66 connects the lever 65 and lever 50 so that each time the shaft 51 is moved, the deflector 49 is moved rearwardly to move the cards rearwardly in the receptacle 48. A link 67 connects the lever 65 and a lever 68 which is in turn connected by a link 69 with the lever 39, so that the feeder 34 is advanced by the depression of the platform to bring the foremost card to printing position, and when the platform raises during the interval of one car moving off of and the next car moving onto the platform, the parts will return toward normal position thereby moving the deflector 49 forwardly and the feeder 34 rearwardly to release the foremost card so that it drops down into the receptacle.

The cards 33 have concentric arcuate graduations 70, which may represent various units of weights, and the marking edge 59 will print a line 71 across these graduations, to indicate thereon the weight of the object or car.

The operation will readily be understood from the foregoing, but briefly stated is as follows: When the car moves onto the platform, the depression of the platform will swing the printing lever 58, and turning the printing edge 59 through an arc proportional to the weight of the car, and when the car assumes a proper position on the platform with its trucks properly depressing the said members 24, then the lever 10 will bring the printing lever 59 into operation, swinging it so that the printing edge 59 presses the printing ribbon 47 against the foremost card, thereby imprinting a line 71 thereon which will indicate on the graduations 70, the weight of the car. As the car passes off of the platform and the new one passes on, feeder 34 is reciprocated to release the foremost card so that it drops down in the receptacle bringing the next card in the magazine into position for the record of the car that is moving into place on the platform. The successive cars or objects are thus automatically weighed and the weights thereof recorded, it being noted that the weighing mechanism is first properly positioned according to the weight of the object, before the record is made, means being provided for causing the imprint or record to be made depending upon the position of the car on the platform, so as to avoid mistakes and errors in the record.

The magazine 32 and other parts of the apparatus can be constructed to record the weights of a large number of cars, and the apparatus will require no attention, excepting the insertion and removal of the cards on which a complete record of the weights of the cars are kept.

Having thus described the invention, what is claimed as new is:—

1. A weighing apparatus embodying a yieldable platform arranged for the movement of railroad cars thereover, a recording device having a recording member operatively connected to said platform to be positioned by the depression of the platform, and means operated by the wheels of the cars and adjustable with respect to the platform longitudinally of the line of movement of the cars for bringing the recording member into operation to make a record when the car is moved on the platform to a predetermined position.

2. A weighing apparatus embodying a yieldable platform, a recording device having a recording member operatively connected to the platform to be positioned by the depression of the platform, and adjustable means operated by the movement of an object on the platform to a predetermined selected position and operatively connected to the recording member to bring it into operation for recording the weight of the object.

3. A weighing apparatus embodying a yieldable platform, a recording device having a recording member operatively connected to the platform to be positioned thereby, a pair of tread members adjustably mounted on the platform at different positions to be depressed by the wheels of an object moved to a predetermined position on the platform, and means operated by the depression of both said members for operating the recording member to make a record.

4. A weighing apparatus embodying a yieldable platform, a recording device having a recording member operatively connected to the platform to be positioned thereby, a pair of levers carried by the platform, adjustable tread members mounted on said levers for depression by the wheels of an object moved onto the platform, a floating lever supporting the free portions of said levers, and means operated by the depression of the floating lever by both of the first named levers for operating the recording member to make a record of the weight of the object.

5. A weighing apparatus embodying a shaft, a recording member pivoted thereto, object-operated means for turning said shaft to position said member according to the weight of the object, a magazine for cards, a receptacle for the cards below the magazine, a ratchet feeder within the magazine for feeding the cards in succession to a position to be operated on by the recording member and to drop into the receptacle, means for operating said feeder as the recording member is positioned and returned, means for moving the cards into the receptacle, and means controlled by the positioning of an object on the object-operated means for swinging recording member into operation against the foremost card in the magazine.

In testimony whereof I have signed my name to this specification in the presence of two subscribing witnesses.

STEPHEN WALTER SHUFORD.

Witnesses:
 A. W. PLESS,
 J. W. WINBORNE.